US007926355B2

(12) United States Patent
Bannier et al.

(10) Patent No.: US 7,926,355 B2
(45) Date of Patent: Apr. 19, 2011

(54) MICROMECHANICAL PART WITH AN OPENING FOR FASTENING TO A SPINDLE

(75) Inventors: Sebastien Bannier, Sonvilier (CH); David Passannante, Fribourg (CH)

(73) Assignee: Rolex S.A., Geneva (CH)

(*) Notice: Subject to any disclaimer, the term of this patent is extended or adjusted under 35 U.S.C. 154(b) by 213 days.

(21) Appl. No.: 12/414,150

(22) Filed: Mar. 30, 2009

(65) Prior Publication Data

US 2009/0263182 A1 Oct. 22, 2009

(30) Foreign Application Priority Data

Apr. 21, 2008 (EP) .................................... 08405112

(51) Int. Cl.
*G01B 5/30* (2006.01)

(52) U.S. Cl. ............................... 73/760; 73/777; 73/856

(58) Field of Classification Search ............. 73/760–777
See application file for complete search history.

(56) References Cited

U.S. PATENT DOCUMENTS

| | | | | |
|---|---|---|---|---|
| 6,147,790 | A * | 11/2000 | Meier et al. | 359/291 |
| 6,868,726 | B2 * | 3/2005 | Lemkin et al. | 73/514.32 |
| 6,894,576 | B2 * | 5/2005 | Giousouf et al. | 331/154 |
| 2005/0217169 | A1 * | 10/2005 | Kunz | 47/33 |
| 2008/0239446 | A1 * | 10/2008 | Jung et al. | 359/225 |
| 2009/0260470 | A1 * | 10/2009 | Bannier et al. | 74/461 |
| 2010/0054092 | A1 * | 3/2010 | Marmy et al. | 368/324 |

FOREIGN PATENT DOCUMENTS

| | | |
|---|---|---|
| DE | 811 817 C | 8/1951 |
| EP | 1 826 634 A | 8/2007 |

OTHER PUBLICATIONS

European Search Report Application No. 08 40 5112, dated Dec. 9, 2008.

* cited by examiner

*Primary Examiner* — Max Noori
(74) *Attorney, Agent, or Firm* — Westerman, Hattori, Daniels & Adrian, LLP

(57) ABSTRACT

This micromechanical part is intended to be fastened to a spindle and has at least one opening (10, 20, 30) whose edges comprise an alternating arrangement of rigid areas (11) and elastic areas (12, 22, 32). It is possible for those ends (13) of the rigid areas (11) closest to the center C of the opening (10, 20, 30) to be connected by a first circle C1 having a diameter greater than the diameter of a second circle C2 connecting those ends (15, 25, 27) of the elastic areas (12, 22, 32) closest to the center of the opening. In this micromechanical part, each rigid area (11) is formed by a convex portion projecting into the opening (10, 20, 30).

20 Claims, 6 Drawing Sheets

MICROMECHANICAL PART WITH AN OPENING FOR FASTENING TO A SPINDLE

The invention relates to a micromechanical part, such as a wheel, a pinion, a stud, a pin or a hairspring, intended to be fastened to a spindle and having at least one opening whose edges comprise an alternating arrangement of rigid areas and elastic areas.

BACKGROUND OF THE INVENTION

In June 1959, Swiss Patent no. 338146 disclosed a slip coupling in which a wheel, represented in FIG. 1, comprises rigid arms 1 whose ends 2 form a circle whose diameter is equal to the diameter of a spindle to be inserted at the center of the wheel. These rigid arms 1 are themselves provided with radial extensions serving as inwardly directed elastic arms 3. Once the wheel is mounted on the spindle, the elastic arms 3 produce a frictional engagement between the wheel and the spindle.

In February 2006, that is to say almost half a century later, it was proposed to use an opening having a slightly different shape. Thus, European Patent Application no. EP 1 826 634 made publically available the micromechanical part represented in FIG. 2. This micromechanical part comprises an alternating arrangement of stiffening/positioning areas 4 and elastically deformable areas consisting of tongues 5 whose ends 6 penetrate into the opening while extending beyond the theoretical contour of the spindle, thereby providing a clamping function when the spindle is driven into place. The objective was to allow a driving-fit assembly on a spindle or a stud without the risk of fracture.

The openings having the shapes described in the aforementioned patent documents would appear quite capable of reducing the risk of fracture, but they are unsatisfactory, particularly because they do not make it possible to obtain simultaneously a low assembly (driving) force and a high clamping force (the latter being manifested by a high transmission torque before the part starts to slip on the spindle).

SUMMARY OF THE INVENTION

The inventors of the Applicant company have finally arrived at a solution to the aforementioned problem, which had remained unresolved for half a century.

To that end, they have developed a micromechanical part intended to be fastened to a spindle and having at least one opening whose edges comprise an alternating arrangement of rigid areas and elastic areas, it being possible for those ends of the rigid areas closest to the center of the opening to be connected by a first circle having a diameter greater than the diameter of a second circle connecting those ends of the elastic areas closest to the center of the opening, this micromechanical part being distinguished by the fact that each rigid area is formed by a convex portion projecting into the opening.

Hence, the micromechanical part according to the invention makes it possible in particular to:

- center the wheel with respect to the center of the spindle with a high level of precision;
- reduce the risks of fracture during the driving operation;
- increase the tolerance range of the parts to be assembled;
- have better control over the assembly of fragile parts;
- eliminate the risks of microcracks;
- easily detect an assembly produced with an excessively tight clamping or interference fit (to which the formation of microcracks is generally imputed when the material constituting the part is fragile);
- carry out systematic and simple checking of the quality of the assembly; and
- simplify the manufacturing operations since there is no longer any need to carry out a difficult checking process for the absence of microcracks under an electron microscope.

In the micromechanical part according to the invention, the convex portion preferably projects toward the center of the opening.

According to a first embodiment of the invention, each elastic area is formed by a curved arm.

According to a second embodiment of the invention, each elastic area is formed by at least one curved finger.

According to a third embodiment of the invention, each elastic area is formed by at least one substantially rectilinear half-arm.

Advantageously, the micromechanical part according to the invention comprises three rigid areas and three elastic areas. Specifically, this configuration with two times three areas, by virtue of its isostatic nature, simultaneously ensures a common number of contacts and optimum centering.

According to another aspect, the invention relates to a method of reducing the risks of obtaining a defective assembly during the production of an assembly in each case comprising a spindle and a micromechanical part according to the invention.

According to yet another aspect, the invention relates to a method of forming an assembly comprising a micromechanical part according to the invention and a spindle.

These methods have the major advantage of making it possible in a simple manner to obtain assemblies having a virtually zero probability of containing microcracks or of being defective as a result, in particular, of too low a resistance torque.

Other features and advantages of the invention will now be described in detail in the following description which is given with reference to the appended figures, in which.

Figure 6:
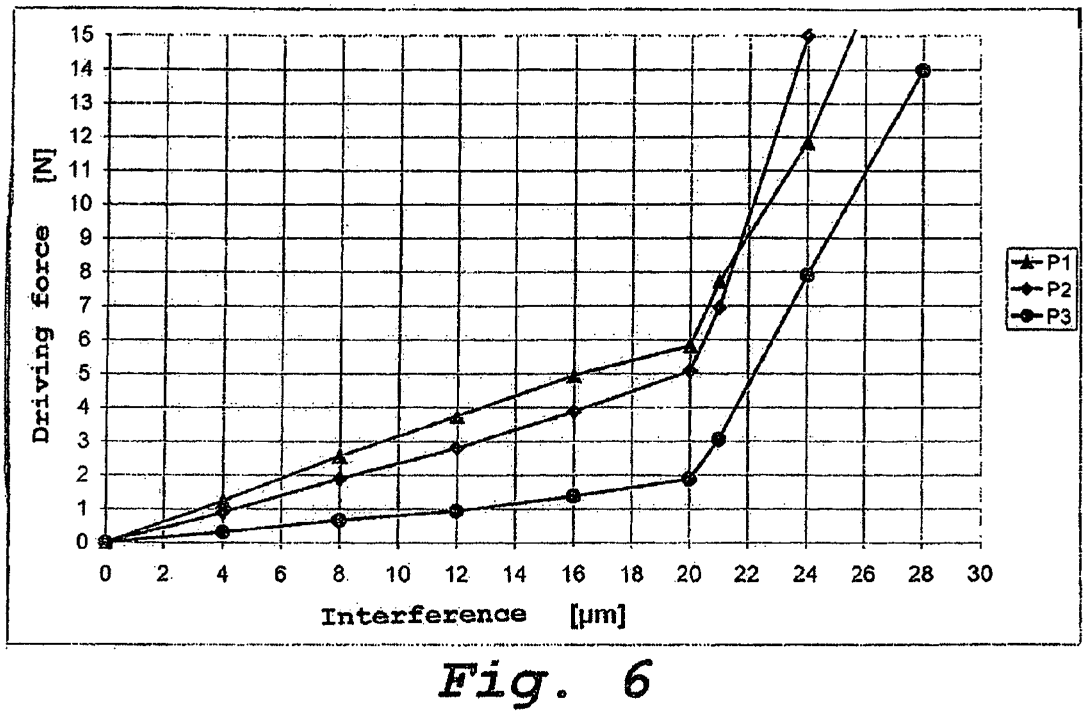
Figure 7:
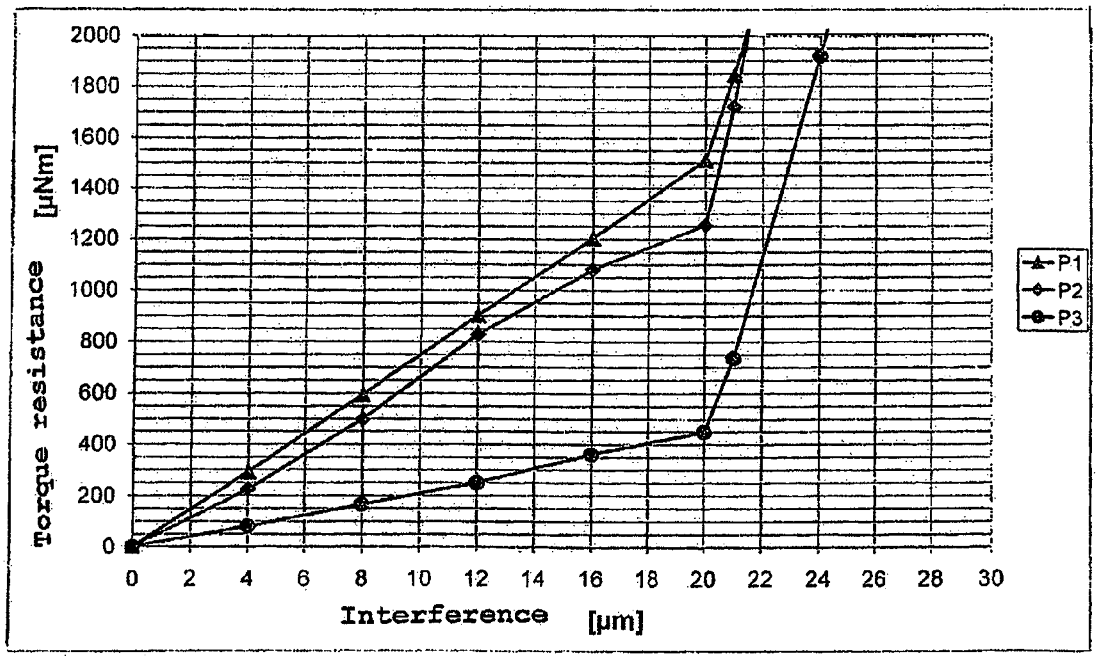

FIG. 6 shows curves representing the change in the force required to drive a spindle into a micromechanical part according to the invention as a function of the interference obtained; and FIG. 7 shows curves representing the change in the maximum torque which can be transmitted by an assembly consisting of a spindle located in a micromechanical part according to the invention as a function of the interference.

DETAILED DESCRIPTION OF THE INVENTION

The invention applies particularly to the field of clockmaking. It is especially suitable for the production of toothed wheels, pinions, collets, guard pins (for pallets), display disks, etc., which can have very small dimensions (of the order of a mm).

Specifically, after driving a spindle into the central hole of a wheel, it is expected that this assembly will hold together with sufficient resistance to provide the desired function. This may simply be the transmission of a torque without one part slipping with respect to the other. It may also be desirable for slip to occur on reaching a given torque.

The minimum resistance torque corresponding to the worst case of the minimum driving force must therefore be greater than the maximum load torque in order to prevent any slip. Moreover, the maximum driving force (corresponding to the maximum resistance torque) must be less than a limit threshold before damage (microcracks or plastic deformation, for example), during assembly.

Figure 1:
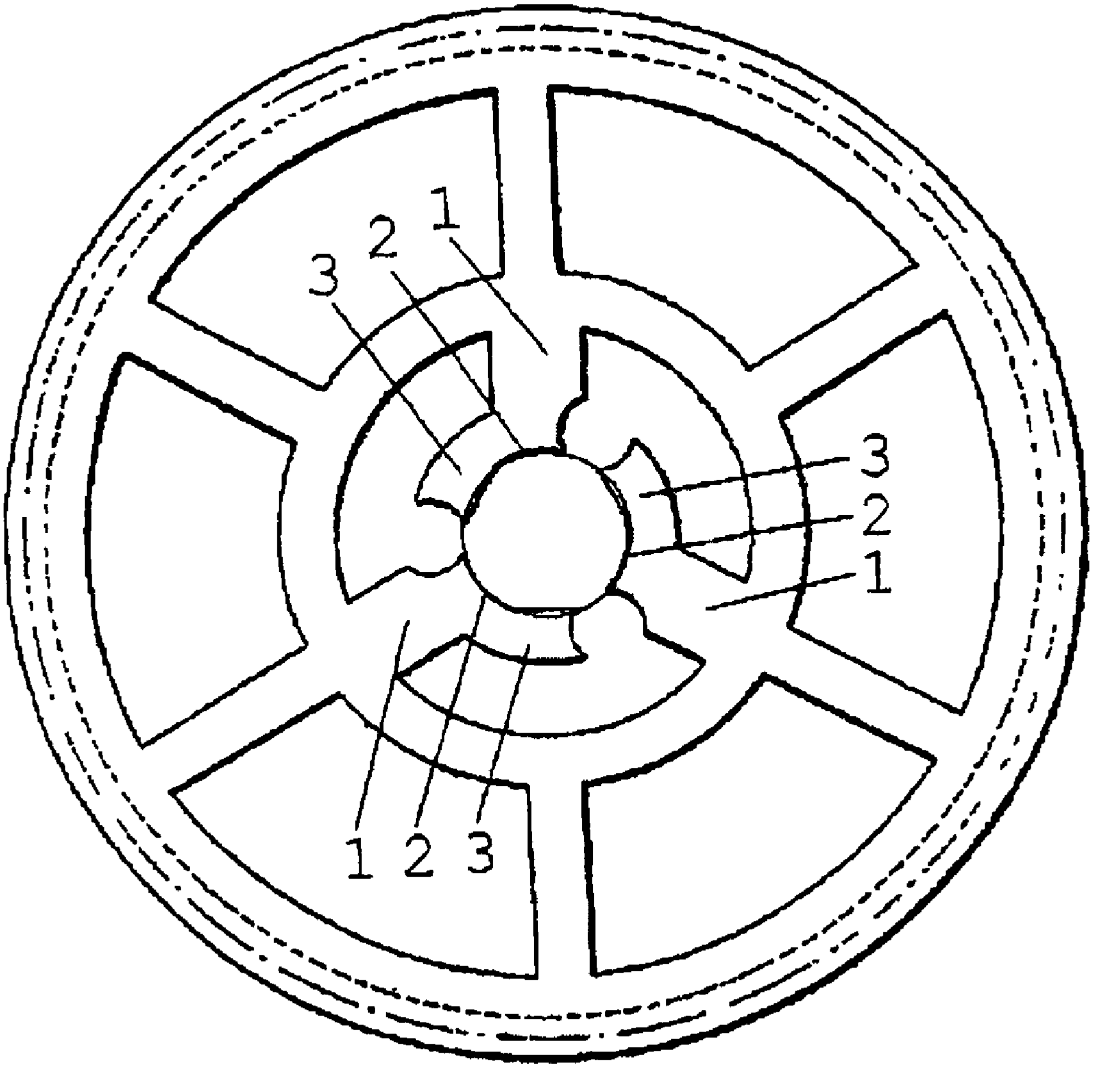
FIG. 1 shows a wheel according to aforementioned patent CH338146, designated “prior art 1”, on which a circle interconnecting the rigid areas has been drawn.
Figure 2:
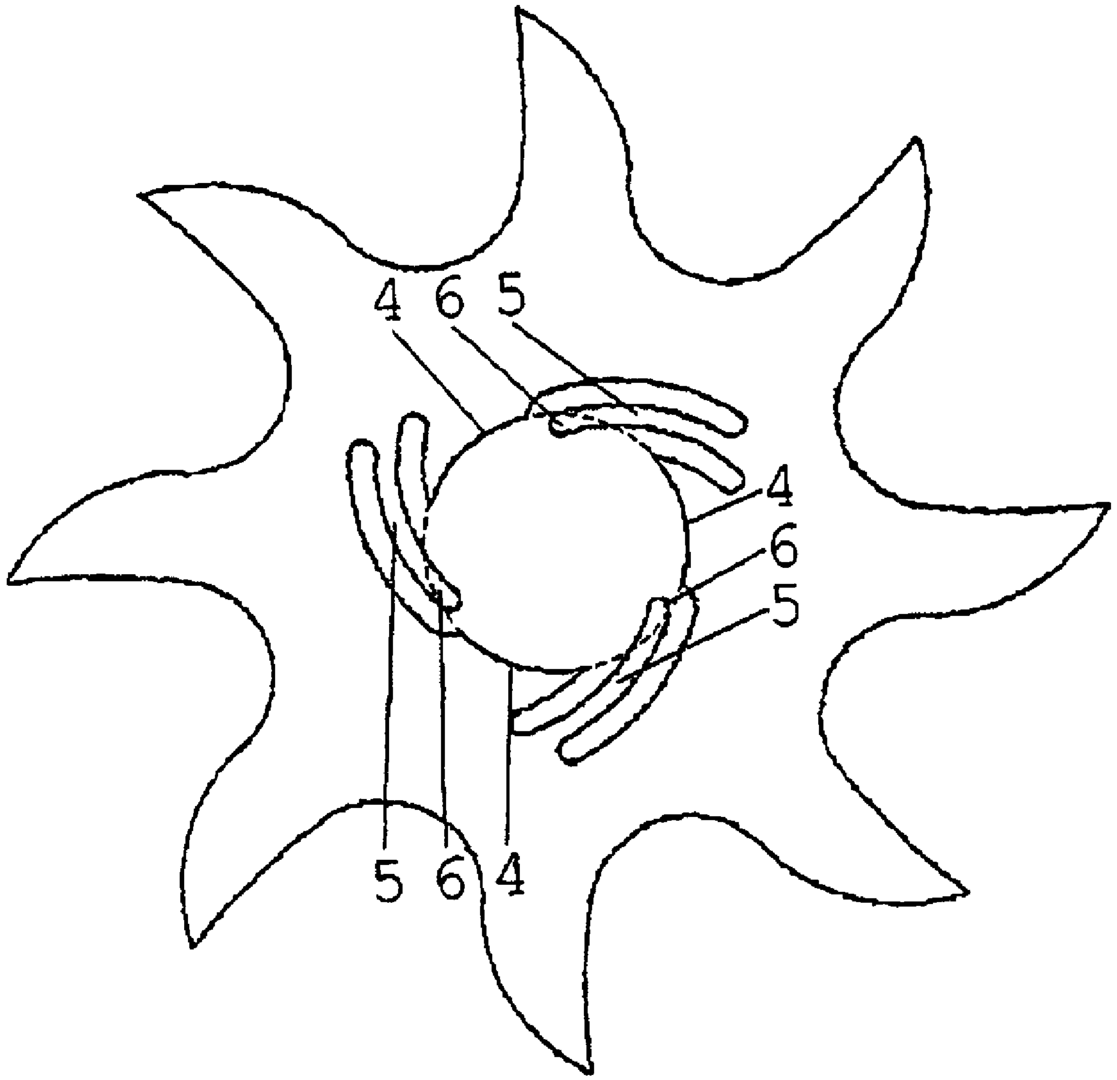
FIG. 2 shows a micromechanical part according to the first embodiment of aforementioned patent application EP 12 826 634, designated “prior art 2”, in which the rigid areas have been interconnected by means of dashed lines.
Figure 3:
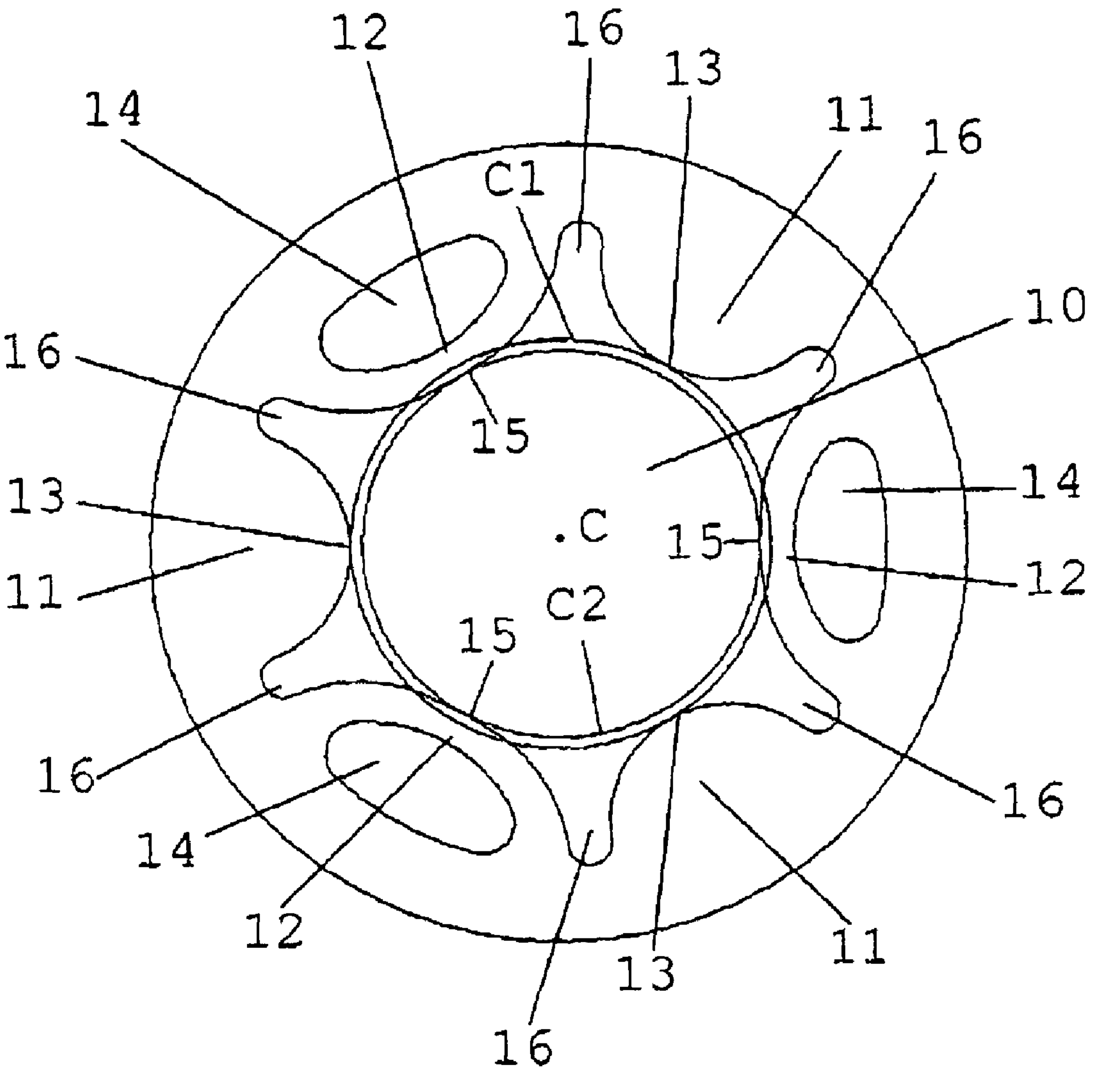
FIG. 3 shows a portion of a micromechanical part according to the first embodiment of the invention.

FIG. 3 partially shows a micromechanical part according to the first embodiment of the invention. This micromechanical part is flat and thin and comprises an opening 10 intended to accommodate a spindle (not shown). Rigid areas 11 and elastic areas 12 alternate over the edges of the opening 10.

The rigid areas 11 are each formed by a convex portion projecting from the micromechanical part in the direction of the center of the opening 10, this center being depicted in FIG. 3 by a point C. The contour of each rigid area 11 is that of a circular arc. All the rigid areas 11 are identical to one another and, by connecting their ends 13 closest to the point C of the opening 10, a first circle C1 is obtained whose center is coincident with the point C.

The elastic areas 12 are each formed by an arm which is curved toward the point C. Each arm has the shape of a ring segment projecting from the micromechanical part toward the point C and in which the largest-diameter side is directed toward the point C. This ring segment separates the opening 10 from a substantially oval cutout 14 formed in the micromechanical part.

The annular shape of the areas 12 along with the cutouts 14 provide the areas 12 with an elasticity which is much greater than that of the areas 11. All the elastic areas 12 are identical to one another and, by connecting their ends 15 closest to the point C of the opening 10, a second circle C2 is obtained whose center is coincident with this point C.

The diameter of the circle C2 is less than that of the circle C1.

Each rigid area 11 is separated, on each side, from the elastic area 12 which is adjacent to it by way of a spacing 16.

The micromechanical part according to this first embodiment comprises three rigid areas alternating with three elastic areas, thereby providing it with a ternary symmetry.

Figure 4:
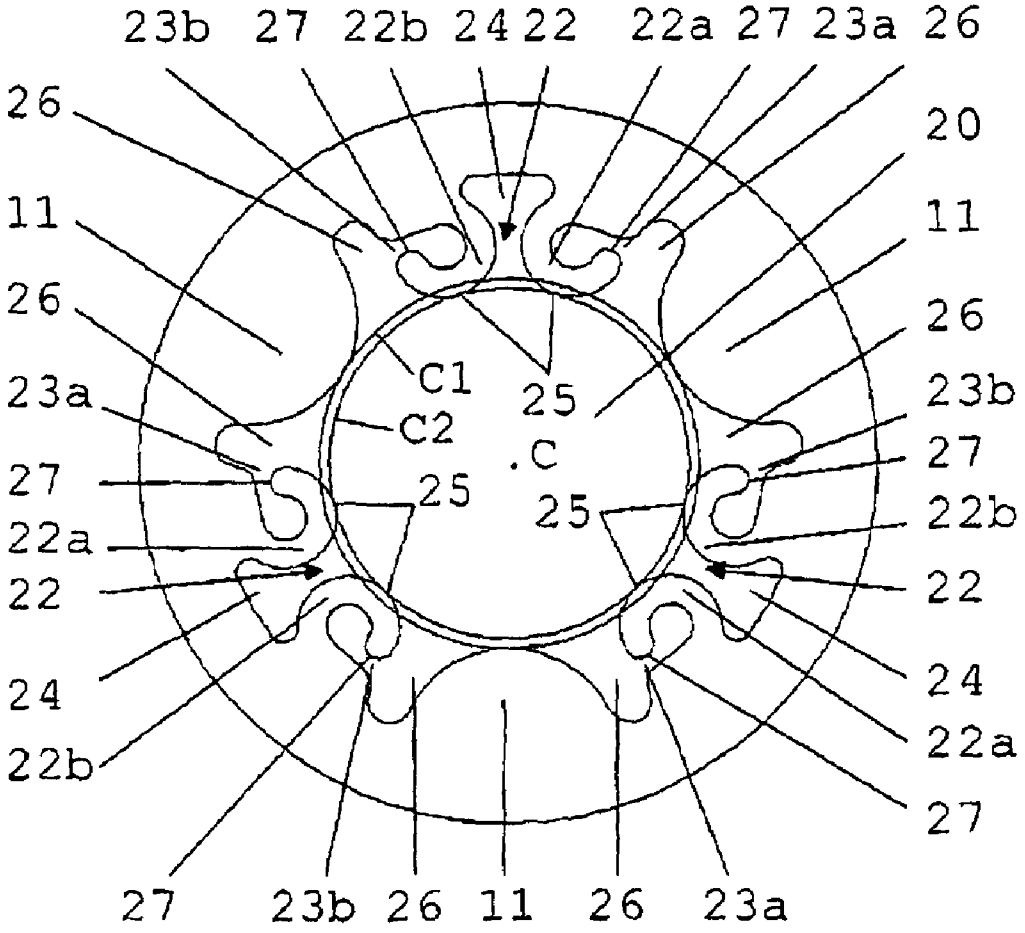
FIG. 4 shows a portion of a micromechanical part according to the second embodiment of the invention.

FIG. 4 partially shows a micromechanical part according to the second embodiment of the invention. This micromechanical part is likewise flat and thin.

The rigid areas 11 are similar to those of the first embodiment and do not therefore need to be described again.

The difference between this embodiment and the first lies essentially in the shape of the elastic areas. Specifically, in this second embodiment, each elastic area 22 is formed by two curved fingers 22*a*, 22*b*.

Each finger 22*a* substantially has the shape of a ring projecting from the micromechanical part and from which a section has been removed in order to form a space 23*a*. Similarly, each finger 22*b* substantially has the shape of a ring projecting from the micromechanical part and from which a section has been removed in order to form a space 23*b*.

The spaces 23*a* and 23*b* of the fingers 22*a* and 22*b* of one and the same area 22 are not directed toward the point C: they are situated between the free end 27 of the ring and the remainder of the micromechanical part. The fingers 22*a* and 22*b* are separated from one another by a space 24. The space 23*a* of the finger 22*a* is situated on the opposite side to the finger 22*b* and, similarly, the space 23*b* of the finger 22*b* is situated on the opposite side to the finger 22*a*. The fingers 22*a* and 22*b* are symmetrical with respect to a straight line passing through the point C and a point situated at the center of the space 24 which separates the fingers.

The annular shape of the fingers 22*a*, 22*b* along with the spaces 23*a*, 23*b* provide the areas 22 with an elasticity which is much greater than that of the areas 11. All the elastic areas 22 are identical to one another and, by connecting their ends 25 closest to the point C, which symbolizes the center of the opening 20, a circle C2 is obtained whose center is coincident with this point C.

Of course, the diameter of the circle C2 is less than that of the circle C1.

When the fingers 22*a*, 22*b* are pushed in a substantially radially outward direction, the spaces 23*a*, 23*b* are reduced in size to the point of disappearing when the free ends 27 of the fingers 22*a*, 22*b* butt against the remainder of the micromechanical part. The latter thus serves as an abutment for the fingers 22*a*, 22*b*.

Each rigid area 11 is separated, on each side, from the neighboring elastic area 22 by way of a spacing 26.

According to this embodiment as well, the micromechanical part comprises three rigid areas alternating with three elastic areas, thereby likewise providing it with a ternary symmetry.

Figure 5:
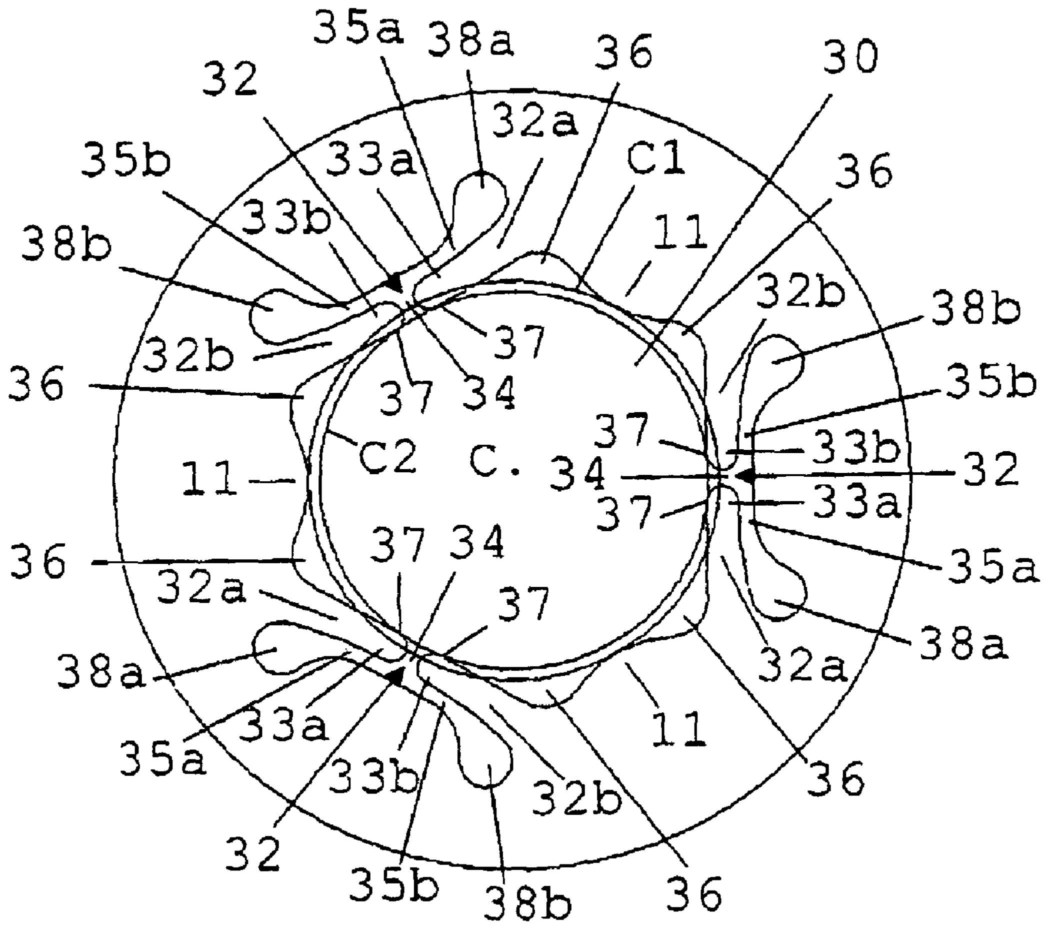
FIG. 5 shows a portion of a micromechanical part according to the third embodiment of the invention.

FIG. 5 partially represents a micromechanical part according to the third embodiment of the invention. This micromechanical part is in turn also flat and thin.

The rigid areas 11 are similar to those of the preceding embodiments and therefore do not need to be described again.

The difference between this embodiment and the previous ones lies essentially in the shape of the elastic areas. Specifically, in this third embodiment, each elastic area 32 is formed by two substantially rectilinear half-arms 32*a*, 32*b*. Each half-arm 32*a* projects from the micromechanical part in a direction forming a slight angle (less than 10 degrees) with a tangent to the circle C1 passing through a point situated midway between the two half-arms 32*a*, 32*b*. Hence, its free end 33*a* is situated closer to the point C, which symbolizes the center of the opening 30.

Similarly, each half-arm 32*b* of the same area 32 projects from the micromechanical part in a direction forming a slight angle (less than 10 degrees) with said tangent, such that the free end 33*b* of the half-arm 32*b* is situated closer to the point C, which symbolizes the center of the opening 30.

The half-arms 32*a*, 32*b* are directed toward one another and their free ends 33*a*, 33*b* are separated by a space 34. Between the half-arms 32*a*, 32*b* and the remainder of the micromechanical part are respectively situated spaces 35*a*, 35*b* which, at the respective bases of the half-arms 32*a*, 32*b* (that is to say at the locations from which these half-arms project) widen substantially in the form of droplets 38*a*, 38*b*.

The elongate shape of the half-arms 32*a*, 32*b* along with the spaces 35*a*, 35*b* provide the areas 32 with an elasticity which is much greater than that of the areas 11. All the elastic areas 32 are identical to one another and, by connecting their ends 37 closest to the point C of the opening 30, a circle C2 is obtained whose center is coincident with this point C.

It goes without saying that, in this embodiment too, the diameter of the circle C2 is less than that of the circle C1.

When the free ends 33*a*, 33*b* of the half-arms 32*a*, 32*b* are pushed in a substantially radially outward direction, the spaces 35*a*, 35*b* are reduced in size to the point of disappearing when the free ends 33*a*, 33*b* butt against the remainder of the micromechanical part. The latter thus serves as an abutment for the half-arms 32*a*, 32*b*.

Each rigid area 11 is separated, on each side, from the neighboring elastic area 32 by a spacing 36.

According to this embodiment as well, the micromechanical part comprises three rigid areas alternating with three elastic areas, thereby likewise providing it with a ternary symmetry.

Tests

Simulations using ANSYS® software were performed on micromechanical parts according to the first (P1), second (P2) and third (P3) embodiments of the invention. These parts were made of Ni—P alloy.

The part P1 had a thickness of 0.2 mm, a circle C2 having a diameter of 0.49 mm, a circle C1 having a diameter of 0.51 mm, convex portions having a radius of curvature of 0.15 mm, arms 12 having a width of 0.04 mm and an outside diameter of 1.0 mm, a distance measured between the circle C1 and the furthest end of the space 16 of 0.15 mm, and a cutout 14 having a width of 0.12 mm and a length of 0.26 mm.

The part P2 had a thickness of 0.2 mm, a circle C2 having a diameter of 0.49 mm, a circle C1 having a diameter of 0.51 mm, convex portions having a radius of curvature of 0.15 mm, fingers 22*a*, 22*b* having an inside diameter of 0.06 mm and an outside diameter of 0.14 mm, a distance measured between the circle C1 and the furthest end of the space 24 of 0.15 mm, spaces 23*a*, 23*b* having a distance, measured between the end 27 and the opposite wall of the part P1, of 0.02 mm, and a distance measured between the circle C1 and the furthest end of the space 26 of 0.15 mm.

The part P3 had a thickness of 0.2 mm, a circle C having a diameter of 0.49 mm, a circle C1 having a diameter of 0.51 mm, convex portions having a radius of curvature of 0.15 mm, half-arms 32*a*, 32*b* having a length of 0.18 mm and a width of 0.04 mm, a space 34 having a length, measured substantially along the axis of the half-arms 32*a*, 32*b*, of 0.02 mm, a distance measured between the circle C1 and the furthest end of the space 36 of 0.04 mm, spaces 35*a*, 35*b* having a minimum width of 0.02 mm and a distance, measured between the furthest walls of the widenings in the shape of droplets 38*a* and 38*b*, of 0.37 mm, these droplet shapes having a diameter of 0.07 mm.

For each of the parts P1, P2, P3, the force required to insert (drive) a spindle, made of 20 AP steel with a hardness of 700 HV, into the respective opening 10, 20, 30 of the part P1, P2, P3, was simulated as a function of the interference, that is to say as a function of the difference between the diameter of the spindle and the diameter of the circle C2. The coefficient of friction μ between the spindle and each part P1, P2, P3, was 0.15.

The results are represented in FIG. 6.

Each of the three parts P1, P2 and P3 is observed to show a linear increase at the start followed by an inflection (increase in the slope) for an interference greater than 20 μm.

It can be deduced from this that, for an interference of between 0 and 20 μm, the linear increase characteristic of the driving force is acceptable. Beyond that value, the characteristic of the driving force increases more rapidly than linearly. Thus, when an interference of 20 μm is reached, the spindle comes into contact with the rigid areas. From that moment, any increase in the interference value (>20 μm) is countered by the rigid areas. An inflection (rapid increase in the driving force) is observed. The elastic arms do not reach the elastic limit for this value of 20 μm but for a higher value. The elastic limit of the arms is never reached. Specifically, owing to the presence of the rigid areas, a very rapid and very large increase in the clamping force is observed, resulting in the need to reject the assembly.

The parts P1, P2 and P3 were designed such that, when the value of 20 μm is reached, the rigid projections come into play; approximately 70% of the elastic limit of the elastic areas is reached. In fact, it is necessary to place the rigid areas judiciously so that the increase in force corresponds to the start of the area at risk, with a safety margin. The increase in the driving force at an interference of 20 μm is associated only with the driving engagement over the rigid areas. If the rigid areas were omitted, it would not be possible in any event to detect the elastic limit of the material being exceeded by an anomaly in the driving force.

According to the invention, the design is such that, when the rigid areas come into play, the arms are still within the elastic stress range.

Therefore, with the parts P1, P2 and P3 according to the invention, the manufacturing tolerance range for the parts can be wide since the dimensional variation in the parts has little influence on the driving force (we still remain within the elastic stress region of the arms). This force thus remains acceptable for all the parts within the tolerance range, resulting in practice in lower manufacturing demands and/or a reduction in the number of rejects for noncompliance.

Moreover, given that the resistance to "drive-out" (expulsion of the spindle) is directly connected to the driving force and that the minimum resistance to a drive-out caused by an impact of 5000 g must generally be at least 0.1 N, it is observed that, even in the case of a minimum interference (4 μm), this minimum impact resistance is achieved with the three parts P1, P2 and P3.

Next, the value of the maximum torque that can be transmitted by the assembly (that is to say that this value at best is transmitted, but never more) was simulated as a function of the interference.

The results are represented in FIG. 7.

In the case illustrated, the minimum value of the torque that the assembly must be capable of transmitting must be at least 16 μNm. It is found that, even in the case of P3, which provides the lowest values, a value of 80 μNm, that is to say a significantly larger value than what is necessary, is already achieved with an interference of 4 μm.

Moreover, it will be noted that, in the case of P3, the value of the maximum transmissible torque increases little with the interference. With judicious dimensioning, the part P3 can therefore advantageously find an application as a limiter of the torque to be transmitted since, even with large dimensional variations, it can be guaranteed that the maximum torque that can be transmitted by the assembly will remain limited.

Comparative Test

A micromechanical part P2 according to the invention was compared with two parts as described in the aforementioned prior arts 1 and 2.

Simulations were performed using ANSYS® software on the three parts under the same conditions, namely:

- identical spindles (diameter ϕ 0.51 mm, 20 AP steel with a hardness of 700 HV);
- material: NiP, thickness 0.2 mm, coefficient of friction with the spindle μ=0.15, interference of 12 μm; and
- identical simulation parameters (mesh size, calculation increment, contact formulation, etc.).

The comparison criterion was the ratio of the resistance torque to the maximum principal stress (which represents the standard verification criterion for fragile materials). The higher the value of the criterion, the better the micromechanical part.

The results are indicated in the following table:

| Part tested | Maximum principal stress (MPa) | Resistance torque (μNm) | Torque/ stress ratio (μNm/MPa) |
|---|---|---|---|
| Prior art 1 | 354 | 41 | 0.116 |
| Prior art 2 | 307 | 4 | 0.013 |
| P2 | 1440 | 560 | 0.389 |

It is found that the part P2 provides much superior results to those obtained with the parts of the prior art.

Methods According to the Invention

In the micromechanical parts according to the invention, the rigid areas serve essentially for guiding purposes when driving the spindle which is to be inserted into the opening, and the elastic areas serve to retain this spindle by clamping in order to prevent it from turning with respect to the micromechanical part or else from moving in a direction substantially perpendicular to the plane of this part.

As has been seen in relation to FIG. 6, it is possible to define, for each micromechanical part according to the invention, an interference value above which the driving force increases rapidly and, as a consequence, the risk of microcracks occurring in the micromechanical part becomes considerable.

It is therefore desirable to reject those parts whose assembly has required a high driving force.

Similarly, it is desirable to reject those parts which are not liable to guarantee a torque above the minimum torque required for the correct operation of transmission without slip.

Therefore, the invention also relates to a method of reducing the risks of obtaining a defective assembly during the production of an assembly formed by a spindle and by a micromechanical part according to the invention, this method comprising the following successive steps:

- the force required during the insertion of the spindle into the micromechanical part is measured;
- the measured value is compared with a first reference value and with a second reference value;
- if the measured value is greater than the first reference value or less than the second reference value, the assembly is considered to be unsatisfactory and is rejected;
- if the measured value is less than or equal to the first reference value and greater than or equal to the second reference value, the assembly is considered to be satisfactory and is retained.

The first reference value which is used in the methods according to the invention is thus the value corresponding to a value which is approximately 30% less than the limit of elasticity of the elastic areas, and corresponds, in the tests described above, to an interference of 20 μm for the parts P1, P2 and P3.

The second reference value is the limit below which the part does not manage to transmit a sufficient torque for the correct operation of the transmission.

In parallel, the invention also relates to a method of forming an assembly comprising a micromechanical part and a spindle, comprising the following successive steps:

- a spindle is inserted into a micromechanical part according to the invention while measuring the force required for the insertion;
- the measured value is compared with a first reference value and with a second reference value;
- if the measured value is greater than the first reference value or less than the second reference value, the assembly is rejected;
- if the measured value is less than or equal to the first reference value and greater than or equal to the second reference value, the assembly is retained.

FIGS. 3, 4 and 5 have shown only those portions of the micromechanical parts according to the invention that are necessary to explain the invention. It goes without saying that a person skilled in the art will know how to complete these figures by adding the missing components of a wheel, a pinion, a stud, a pin or a hairspring, for example.

The micromechanical parts according to the invention can be produced, for example, from materials such as silicon, nickel, nickel alloys such as nickel-phosphorus, diamond, quartz, etc.

The use of the manufacturing technology known as LIGA (a German acronym for "Röntgenlithographie, Galvanoformung, Abformung" [X-ray lithography, electroplating, molding]) may advantageously be employed to obtain parts made of nickel or nickel-phosphorus that have relatively complex shapes. The use of a micromanufacturing technology, for example by means of a deep etching process, may also be employed to obtain parts having relatively complex shapes from silicon, diamond or quartz wafers.

The micromechanical parts represented in FIGS. 3 to 5 all comprise three rigid areas and three elastic areas since these are preferred configurations. However, without departing from the scope of the invention, it is possible to contemplate other micromechanical parts having a greater number of rigid or elastic areas and/or different dimensions and/or shapes. For example, it is possible for the convex portion not to be in the form of a circular arc but to be defined by a radius of variable curvature, in the form of an oval arc, and, instead of being directed toward the center of the opening, to be directed in a direction which is offset with respect to this center.

Furthermore, the micromechanical parts according to the invention are not necessarily flat. Indeed, the LIGA technology mentioned above makes it possible to produce multilayer parts, for example a wheel board with a pinion.

Moreover, when the parts are made of nickel-phosphorus or silicon, they are more fragile in tension than in compression. Therefore, the part P2 according to the invention (FIG. 4) is particularly favorable, since the bending stress results in low tension on the center side and in high compression on the opposite side.

Finally, it should be added that the parts can have a more reduced symmetry. In the case of the parts P2 and P3 according to the invention for example, it may be advantageous to produce half-arms which are not symmetrical (in terms of length and/or width), the effect of which is thus to provide the part with a resistance torque which is higher in one direction than in the other.

The invention claimed is:

1. A micromechanical part intended to be fastened to a spindle and having at least one opening whose edges comprise an alternating arrangement of rigid areas and elastic areas, it being possible for those ends of the rigid areas closest to the center of the opening to be connected by a first circle having a diameter greater than the diameter of a second circle connecting those ends of the elastic areas closest to the center of the opening, this micromechanical part being defined by the fact that each rigid area is formed by a convex portion projecting into the opening.

2. The micromechanical part as claimed in claim 1, wherein the convex portion projects toward the center of the opening.

3. The micromechanical part as claimed in claim 1, wherein each elastic area is formed by a curved arm.

4. The micromechanical part as claimed in claim 1, wherein each elastic area is formed by two curved fingers.

5. The micromechanical part as claimed in claim 1, wherein each elastic area is formed by at least one rectilinear half-arm.

6. The micromechanical part as claimed in claim 1, which comprises three rigid areas and three elastic areas.

7. An assembly formed by a micromechanical part as claimed in claim 1 and by a spindle.

8. A method of transmitting a torque, comprising using a micromechanical part as claimed in claim 5 for limiting the torque that is to be transmitted by an assembly formed by this micromechanical part and a spindle.

9. A method of reducing the risks of obtaining a defective assembly during the production of an assembly formed by a micromechanical part as claimed in claim 1 and by a spindle, which comprises the following successive steps:

the force required during the insertion of a spindle into the micromechanical part is measured;

the value of the measured force is compared with a first reference value;

the value of the measured force is compared with a second reference value;

if the measured value is greater than the first reference value or less than the second reference value, the assembly is rejected;

if the measured value is less than or equal to the first reference value and greater than or equal to the second reference value, the assembly is retained.

10. A method of forming an assembly formed by a micromechanical part as claimed in claim 1 and by a spindle, which comprises the following successive steps:

a spindle is inserted into the micromechanical part while measuring the force required for the insertion;

the measured value is compared with a first reference value;

if the measured value is greater than the first reference value or less than a second reference value, the assembly is rejected;

if the measured value is less than or equal to the first reference value and greater than or equal to the second reference value, the assembly is retained.

11. The micromechanical part as claimed in claim 2, wherein each elastic area is formed by a curved arm.

12. The micromechanical part as claimed in claim 2, wherein each elastic area is formed by two curved fingers.

13. The micromechanical part as claimed in claim 2, wherein each elastic area is formed by at least one rectilinear half-arm.

14. The micromechanical part as claimed in claim 2, which comprises three rigid areas and three elastic areas.

15. The micromechanical part as claimed in claim 3, which comprises three rigid areas and three elastic areas.

16. The micromechanical part as claimed in claim 4, which comprises three rigid areas and three elastic areas.

17. The micromechanical part as claimed in claim 5, which comprises three rigid areas and three elastic areas.

18. An assembly formed by a micromechanical part as claimed in claim 2 and by a spindle.

19. An assembly formed by a micromechanical part as claimed in claim 3 and by a spindle.

20. An assembly formed by a micromechanical part as claimed in claim 4 and by a spindle.

* * * * *